(12) United States Patent
Kalmbach et al.

(10) Patent No.: US 9,267,595 B2
(45) Date of Patent: Feb. 23, 2016

(54) DRIVE DEVICE FOR A MOTOR VEHICLE

(71) Applicant: Siemens Aktiengesellschaft, München (DE)

(72) Inventors: Klaus Kalmbach, Mössingen (DE); Klaus Schleicher, Nürnberg (DE); Janina Steinz, Stuttgart (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 307 days.

(21) Appl. No.: 13/862,955

(22) Filed: Apr. 15, 2013

(65) Prior Publication Data

US 2013/0269478 A1 Oct. 17, 2013

(30) Foreign Application Priority Data

Apr. 16, 2012 (DE) .......................... 10 2012 206 139

(51) Int. Cl.
*F16H 57/04* (2010.01)
*H02K 9/00* (2006.01)
*F16H 57/02* (2012.01)

(52) U.S. Cl.
CPC ........ *F16H 57/0445* (2013.01); *F16H 57/0476* (2013.01); *F16H 57/0484* (2013.01); *F16H 2057/02034* (2013.01); *Y10T 74/2189* (2015.01)

(58) Field of Classification Search
CPC ............ Y10T 74/2186; Y10T 74/2189; F16H 57/0484; F16H 57/0476; F16H 57/0445; F16H 2057/02034

USPC ................ 74/606 A, 606 R; 475/6, 159, 160; 310/52, 54, 58, 59
See application file for complete search history.

(56) References Cited

U.S. PATENT DOCUMENTS

| | | | | |
|---|---|---|---|---|
| 4,600,848 A | * | 7/1986 | Sutrina et al. ................... | 310/54 |
| 7,508,100 B2 | * | 3/2009 | Foster ............................. | 310/54 |
| 7,834,492 B2 | * | 11/2010 | Iund et al. ....................... | 310/52 |
| 8,840,511 B2 | * | 9/2014 | Seno et al. ..................... | 475/159 |
| 8,968,138 B2 | * | 3/2015 | Kalmbach et al. ............. | 475/150 |
| 2009/0233749 A1 | * | 9/2009 | Tomita et al. ................. | 475/159 |
| 2013/0274053 A1 | * | 10/2013 | Bauerlein et al. ............. | 475/150 |

FOREIGN PATENT DOCUMENTS

DE 102005012378 A1 11/2005
DE 102010008584 A1 8/2011

* cited by examiner

*Primary Examiner* — Adam D Rogers
(74) *Attorney, Agent, or Firm* — Henry M. Feiereisen LLC

(57) ABSTRACT

A drive device for a motor vehicle includes at least one electric machine having at least one rotor element which is configured to delimit an installation area in a radial direction. At least one transmission device is disposed, at least partly, in the installation area and configured to be driven by the electric machine via the rotor element. A fluid supply device having at least one fluid channel is provided for supply of fluid to at least one cooling or lubrication point of the drive device. The fluid channel has a first part area running in a stationary first component, and a second part area which adjoins the first part area in a flow direction of the fluid through the fluid channel and runs in a second component of the drive device. The second component is supported for rotation about an axis of rotation in relation to the first component.

8 Claims, 1 Drawing Sheet

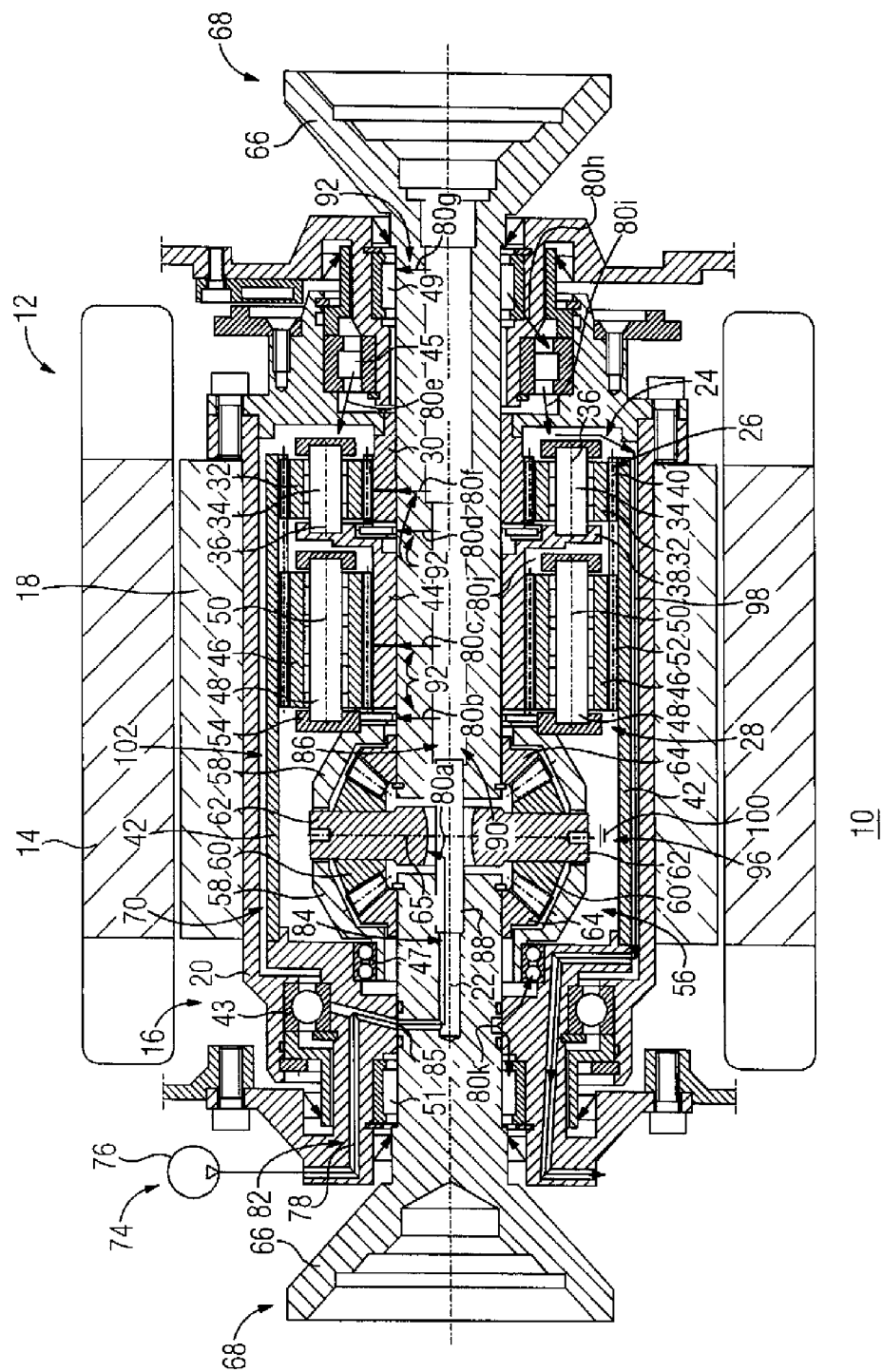

DRIVE DEVICE FOR A MOTOR VEHICLE

CROSS-REFERENCES TO RELATED APPLICATIONS

This application claims the priority of German Patent Application, Serial No. 10 2012 206 130.8, filed Apr. 16, 2012, pursuant to 35 U.S.C. 119(a)-(d), the content of which is incorporated herein by reference in its entirety as if fully set forth herein.

BACKGROUND OF THE INVENTION

The present invention relates to a drive device for a motor vehicle.

The following discussion of related art is provided to assist the reader in understanding the advantages of the invention, and is not to be construed as an admission that this related art is prior art to this invention.

Drive devices for motor vehicles are sufficiently well known from the prior art and also from series production of motor vehicles, especially of automobiles. Such a drive device includes at least one drive unit, which is an internal combustion engine or an electric motor for example and which is used to drive the motor vehicle. In addition a transmission can be provided, which is able to be driven by the drive unit and via which the motor vehicle is able to be driven. For this purpose for example torques are taken off from the transmission via drive shafts and are supplied to driven wheels of the motor vehicle.

Such drive devices demand much installation space. In addition, cooling and/or lubrication of the drive device play a not-insignificant role in guaranteeing a desired function of the drive device, even over a long service life.

It would therefore be desirable and advantageous to provide an improved drive device for a motor vehicle to obviate prior art shortcomings.

SUMMARY OF THE INVENTION

According to one aspect of the present invention, a drive device for a motor vehicle includes at least one electric machine having at least one rotor element which is configured to delimit an installation area in a radial direction, at least one transmission device disposed, at least partly, in the installation area and configured to be driven by the electric machine via the rotor element, and a fluid supply device having at least one fluid channel for supply of fluid to at least one cooling and/or lubrication point of the drive device, the fluid channel having a first part area running in a stationary first component, and a second part area which adjoins the first part area in a flow direction of the fluid through the fluid channel and runs in a second component of the drive device, the second component being supported for rotation about an axis of rotation in relation to the first component.

As the at least one transmission device can be driven via the rotor element of the electric machine, torque provided by the electric machine can be introduced via the rotor element into the transmission device. The transmission device serves in this case to convert and/or to transmit the torque. Through integration of the transmission unit into the rotor element, the installation space required for a drive device according to the invention is particularly small. The transmission device does not adjoin the rotor element in the axial direction and is not linked in the axial direction to the rotor element but is surrounded and covered over in the radial direction by the rotor element at least partly, especially completely. Thus a loss of axial installation space which would result from disposing the transmission device in the axial direction next to the rotor element is avoided so that a drive device according to the invention requires little installation space, especially in the axial direction of the rotor element.

To realize an advantageous, effective and efficient cooling and/or lubrication of the drive device, a fluid supply device with at least one fluid channel is additionally provided. At least one cooling and/or lubrication point of the drive device is able to be supplied with fluid for lubrication and/or cooling of the cooling and/or lubrication point via the fluid channel. The fluid channel runs in at least one part area in the stationary first component of the drive device and in at least one second part area, adjoining the first part area in the direction of flow of the fluid to the cooling and/or lubrication point through the fluid channel, runs in the second component of the drive device able to be rotated around an axis of rotation relative to the first component. Thus, fluid first enters the stationary, non-rotating first component. Subsequently the fluid is supplied via the fluid channel to the rotatable or rotating second component. This makes it possible in an effective and efficient way to cool at least one component of the drive device via the cooling and/or lubrication point so that a desired functionality of the drive device can be ensured even over a long service life.

The cooling and/or lubrication especially enables losses caused by toothed wheels of the transmission device rolling off one another and/or losses caused by bearing friction of the drive device to be kept small.

The fluid can be used for transporting away dissipated heat so that especially components of the drive device assigned to the transmission device and disposed at least partly in the installation area can be cooled especially by convective cooling. Thus, the operating temperature of the drive device can be kept within a small framework.

The transmission device can be disposed completely in the installation area and thus to be completely covered externally in the radial direction by the rotor element. As a result, the drive device requires especially little space, especially in the axial direction.

According to another advantageous feature of the present invention, the second component may be a shaft rotatable about the axis of rotation. This enables fluid to be conveyed over a relatively long distance. Furthermore this allows the advantageous distribution of the fluid to a plurality of possible cooling and/or lubrication points of the drive device.

According to another advantageous feature of the present invention, the fluid channel may have a first channel area running in the shaft in an axial direction, and a second channel area adjoining the first channel area and running in a radial direction of the shaft. Lubricant can thus flow from the first channel area into the second channel area. The radial course of the second channel area is advantageous as fluid can be conveyed by the centrifugal force as a result of the rotation of the shaft through the second cooling area to the cooling and/or lubrication point. Thus, fluid can be conveyed in a particularly simple manner.

The channel areas in the shaft can be realized by configuring the shaft for example as a hollow shaft. The channel areas are formed for example by holes drilled in the shaft, especially the hollow shaft.

Advantageously, the second channel area opens out onto the cooling and/or lubrication point. This enables the fluid conveyed by the centrifugal force through the second channel area to emerge at least essentially directly at the cooling and/or lubrication point and to cool and/or especially lubricate the corresponding components of the drive device. This makes it possible for example to lubricate and to cool at least one toothed wheel to be lubricated and cooled and/or to lubricate and to cool at least one bearing, especially a roller bearing, to be cooled and lubricated. Sealing elements such as radial shaft seals for example can also be lubricated by means of this system, in order to avoid a premature failure or to minimize friction losses.

The centrifugal force caused by the rotation of the second component, especially of the shaft, transports fluid along wall surfaces of the drive device, especially of the transmission device. Fluid cools down on the walls and collects especially through gravity at the at least one lowest point in the housing in the height direction.

According to another advantageous feature of the present invention, the first component can be a housing part of the drive device. The housing part is for example a housing part of the transmission device and thus a transmission housing. Through this, an especially simple and simultaneously efficient and effective guidance of the fluid is realized. The housing part may advantageously be disposed at least partly in the installation area. This leads to an especially small space requirement for the inventive drive device. The housing part can be cooled by the fluid. In other words, the fluid is used to transport dissipated heat away from the housing part, so that the operating temperature of the drive device and especially of the transmission device can be kept low.

If the housing part is assigned to the transmission device, heat can be dissipated via the fluid to a surface of the housing for convective cooling to the surroundings of the housing part.

A drive device according to the present invention is configured to enable to cool and lubricate components of the drive device by the fluid. Cooling is realized for example as a result of fluid flowing through the fluid channel. As an alternative or in addition cooling occurs as a result of the fluid being taken out of a fluid reservoir in which fluid can collect upstream from the cooling and lubrication point via at least one outlet channel and flowing through the outlet channel. Heat is hereby transported away n this throughflow process. The corresponding components are lubricated for example by the fluid emerging from the fluid channel through which fluid is applied to the component to be lubricated.

According to another advantageous feature of the present invention, at least one air gap can be provided in a radial direction between the housing part, disposed at least partly in the installation area, and the rotor element, via which the rotor element is to be cooled by the fluid-cooled housing part. Thus, the operating temperature of the rotor element can also be kept low, which is beneficial to the functions and performance of the drive device.

The electric machine can be embodied as an asynchronous machine, especially an asynchronous motor, or as a synchronous machine, e.g. as a permanent magnet machine, especially as a permanent magnet motor, and can be operated in a motor operating mode in which it drives the transmission device.

The electric machine may also be operated in a generator mode, so that for example mechanical energy introduced into the electric machine via driven wheels of the motor vehicle, the transmission device and the rotor can be converted at least partly into electrical energy. This enables recovery of braking energy for example.

According to another advantageous feature of the present invention, at least one heat exchanger can be is disposed upstream of the first part area for cooling fluid. Fluid is thus initially cooled by the heat exchanger before being supplied to the fluid channel running in the first component. Especially low temperatures of the fluid can be realized by the heat exchanger, so that the corresponding components to be lubricated and/or to be cooled can be cooled and/or lubricated especially effectively and efficiently. The heat exchanger may be disposed outside the transmission device and the rotor element and especially outside the installation area, so that an advantageous heat transfer from the hot fluid via the heat exchanger to the surroundings of the heat exchanger can take place.

According to another advantageous feature of the present invention, at least one pump device can be provided to convey fluid, collected in the fluid reservoir, out of the fluid reservoir. This enables fluid to be conveyed out of the fluid reservoir even at relatively high lateral accelerations, so that lubrication and/or cooling of the drive device is ensured even in the presence of such lateral forces. The pump device is configured to pump fluid, collected and heated up in the fluid reservoir, out of the fluid reservoir, also referred to as the oil sump, and to supply it to the external heat exchanger for cooling the fluid. Subsequently the cooled fluid is supplied to the fluid channel running in the first component, through which the fluid circuit is closed According to another advantageous feature of the present invention, at least two cooling and/or lubrication points can be provided, with each of the cooling and/or lubrication points being assigned to at least one channel area. The cooling and/or lubrication points can be supplied with fluid via the channel areas of the fluid channel, so that corresponding components can be cooled and/or lubricated via the respective cooling and/or lubrication points. The channel areas may have differently sized flow cross-sections through which fluid can respectively flow. The flow cross-sections of the channel areas can thus be suited to the corresponding components, which are also referred to as consumers, so that the flow of fluid through the fluid circuit can be optimized. The cooling and/or lubrication point can also be referred in general as point of consumption.

To realize an especially advantageous conveyance of the fluid and also to supply the cooling and/or lubrication point with the correct amount of fluid required, a pump device can be provided for conveying the fluid and configured to set a pressure of the fluid. In particular pressure regulation is able to be carried out by the pump device, so that the fluid pressure can be suited for example to different driving situations. The pump device may be the same as the pump device for conveying fluid out of the fluid reservoir.

According to another advantageous feature of the present invention, a cooling device with at least one cooling channel for cooling a stator of the electric machine may be provided. Fluid for cooling the stator flows hereby through the cooling channel. In other words, the fluid serves both to cool and/or lubricate the cooling and/or lubrication point and also to cool the stator. Advantageously, cooling and/or lubrication of the transmission device can be combined with cooling of the stator, with cooling and/or lubrication of the transmission device and cooling of the stator being realized by fluid in a serial or parallel arrangement of the respective fluid circuit. Cooling and/or lubricating the drive device is thus simplified so that the drive device requires only little space. Using the centrifugal force, the effort involved in conveying the fluid can also be kept small. Through alternative or additional use of the pump device and the possible setting of fluid the pressure enables lubrication and/or cooling under pressure so that the corresponding components of the drive device can especially be supplied with the corresponding amount of fluid required.

A drive device according to the invention enables a central cooling of all components of the drive device to be cooled and especially of the transmission device as well as a central lubrication of all components to be lubricated and especially rotating components of the drive device, especially of the transmission device. Using fluid to cool the electric machine enables expansion of the functionality in a space-saving and cost-effective manner while simultaneously realizing a very compact design of the drive device.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a schematic longitudinal sectional view of a drive device for a motor vehicle.

DETAILED DESCRIPTION OF PREFERRED EMBODIMENTS

The depicted embodiment is to be understood as illustrative of the invention and not as limiting in any way. It should also be understood that the FIGURE is not necessarily to scale and that the embodiment may be illustrated by graphic symbols, phantom lines, diagrammatic representations and fragmentary views. In certain instances, details which are not necessary for an understanding of the present invention or which render other details difficult to perceive may have been omitted. The features and combinations of features specified in the description as well as the features and combinations of features specified in the description of the FIGURE and/or in the FIGURE alone are able to be used not only in the respectively specified combination, but also in other combinations or on their own, without departing from the framework of the invention.

Turning now to the FIGURE, there is shown a schematic longitudinal sectional view of a drive device for a motor vehicle embodied for example as a hybrid or electric vehicle, with an electric machine having a rotor element into which a transmission device having two transmission stages is integrated with a differential gear connected serially downstream from one of the transmission stages.

The sole FIGURE shows a drive device according to the present invention, generally designated by reference numeral 10 for a motor vehicle, which is embodied for example as an automobile. The motor vehicle can also be embodied as a hybrid vehicle or as an electric vehicle, especially with a range extender.

The drive device 10 includes an electric machine 12 having a stator 14, shown schematically only, and a rotor element 16, also shown schematically. The rotor element 16 has an active rotor part 18 with a magnetic circuit comprised of coils and/or magnets as well as a rotor carrier 20, to which the active rotor part 18 is attached. The rotor element 16 is rotatable about an axis of rotation 22.

The drive device 10 additionally includes a transmission device 24, which has, as its first transmission stage, a first planetary gear 26 and, as its second transmission stage, a second planetary gear 28. Of course, the respective transmission stages can also be embodied differently.

The first planetary gear 26 has a first sun wheel 30, which is rotatable about the axis of rotation 22 and coupled with the rotor carrier 20. As a result, torque provided by the electric machine 12, when operating in a motor mode via the rotor carrier 20 for example, is introduced into the first sun wheel 30, so that the first sun wheel 30 is driven by the rotor carrier 20. The first planetary gear 26 has a plurality of first planetary wheel elements 32 in mesh with the first sun wheel 30 via respective teeth. The first planetary gear elements 32 are supported on respective first planetary wheel studs 34 rotatable around an axis of rotation 36 and also via the first planetary wheel studs 34 on a first planetary gear carrier 38 of the first planetary gear 26. The first planetary wheel elements 32 can also rotate about the axis of rotation 22.

Furthermore, the first planetary gear 26 has a first fixed hollow wheel 40, which is integrated into a transmission housing 42 of the transmission device 24. Thus, the transmission housing 42 and the first hollow wheel 40 are embodied in one piece with one another, wherein the first hollow wheel 40 does not rotate about the axis of rotation 22 during operation of the drive device 10. The first planetary wheel elements 32 are hereby in mesh via teeth with the first hollow wheel 40. Of course, the presence of a rotating hollow wheel is also conceivable. In addition, it would be conceivable to support the rotor carrier 20 directly on the hollow wheel outer diameter, for example via a friction bearing, as with turbochargers, or via needle bearings.

The second planetary gear 28 has a second sun wheel 44, which is rotatable about the axis of rotation 22 and coupled or linked to the first planetary carrier 38. As a result, the second sun wheel 44 is driven via the first planetary carrier 38 when the drive device 10 is operated. The second planetary gear 28 also includes a plurality of second planetary wheel elements 46 in mesh via teeth with the second sun wheel 44. The second planetary wheel elements 46 are supported on respective second planetary wheel studs 48 for rotation about respective axes of rotation 50 and can also rotate around the axis of rotation 22.

The second planetary gear 28 has a stationary second hollow wheel 52 in mesh via teeth with the second planetary wheel elements 46 and likewise integrated into the transmission housing 42. A second rotating hollow wheel might also be conceivable. In addition it would be conceivable to support the rotor carrier 20 directly on the hollow wheel outer diameter, for example via a friction bearing, such as with turbochargers, or via needle bearings. The second planetary wheel elements 46 are supported or braced by their second planetary wheel studs 48 on a second planetary carrier 54.

The transmission device 24 additionally includes a differential gear 56 with a so-called differential case 58. The differential gear 56 also has a plurality of balance wheels 60, which are supported rotatably via respective balance studs 62 on the differential case 58 around an axis of rotation 65. Furthermore the differential gear 56 has shaft wheels 64, which are linked via teeth to drive shafts 66 in a torque-proof manner. The drive shafts 66 have respective connections 68, via which driven wheels of the vehicle can be linked in a torque-proof manner to the drive shafts 66.

As can be seen from the FIGURE, the differential gear 56 is embodied as a bevel differential gear, wherein the balance wheels 60 and the shaft wheels 64 are embodied as bevel gears meshing with each other via teeth. The differential gear 56 has four balance wheels 60 for example.

As can also be seen from the FIGURE, the transmission device 24 is not flanged into the rotor element 16 in axial arrangement, but by contrast is integrated into the rotor element 16.

The rotor element 16 delimits an installation area 70 in a radial direction, in which the two-stage transmission device 24 is housed with the differential gear 56. The differential gear 56 and/or the first planetary gear 26 may hereby project in the axial direction beyond the active rotor part 18; however neither the differential gear 56 nor the first planetary gear 26 projects beyond the rotor carrier 20 in the axial direction, so that the planetary gears 26, 28 and the differential gear 56 are completely accommodated in the installation area 70 and are surrounded and covered in the radial direction by the rotor element 16, especially the rotor carrier 20.

This projection beyond the active rotor part 18 by the differential gear 56 and/or the first planetary gear 26 in the axial direction can however be avoided with a different ratio of rotor length/diameter/speed/torque.

This avoids a loss of installation space in an axial direction, since neither the differential gear 56 nor the planetary gear 26, 28 are flanged axially onto the rotor element 16. In addition there is an at least essentially ideal and direct distribution of the torque provided by the electric machine 12 in its motor mode via its rotor element 16 at least essentially from the axial center of the rotor element 16 to the two drive shafts 66.

In its motor mode, a flow of force and/or torque is established from the electric machine 12 via its rotor element 16 and especially its rotor carrier 20 via the planetary gear 26, 28 and the differential gear 56 to the drive shafts 66. The rotor element 16, the planetary gear 26, 28 and the differential gear 56 are hereby connected in series with one another in relation to the force and/or torque flow.

The first sun wheel 30 functions as first input element of the planetary gear 26, since the torque is introduced into the first planetary gear 26 via the first sun wheel 30. The first planetary carrier 38 functions as first output element of the first planetary gear 26, since the torque is derived from the first planetary gear 26.

The second sun wheel 44 linked to the first planetary carrier 38 functions as a second input element of the second planetary gear 28, while the second planetary carrier 54 of the second planetary gear 28 serves as a second output element of the second planetary gear 28 and is linked to the differential gear 56, especially to its differential case 58. In other words, the differential case 58 of the differential gear 56 is driven via the second planetary carrier 54, so that the balance wheels 60, and via these the shaft wheels 64, are rotated around the axis of rotation 22 via the differential case 58. Thus the drive shafts 66 are driven to also rotate about the axis of rotation 22.

Through the integration of the planetary gears 26, 28 and the differential gear 56 into the rotor element 16 as well as the corresponding configuration of the transmission stages as the planetary gears 26, 28, the drive device 10 requires especially little space and makes possible the efficient and effective transmission and conversion of the torque provided by the electric machine 12 through to the drive shafts 66.

Roller bearings 43, 45 are provided to support the rotor element 16. In addition a further roller bearing 47 is provided for supporting the differential case 58. The drive shafts 66 are supported by roller bearings 49, 51.

The drive device 10 also includes a lubricant supply device 74 with a pump device 76 for conveying fluid, represented very schematically in the FIGURE. The fluid serves to cool and lubricate components of the drive device 10. For that purpose, the fluid is to be conveyed by the pump device 76 and a fluid channel 78 to a plurality of cooling and/or lubrication points 80a-k. The lubricant supply device 74 also includes a heat exchanger, not shown in the FIGURE, which is disposed upstream from the fluid channel 78 and serves to cool the fluid heated up by the lubrication and/or cooling. The fluid may involve lubricating oil for example.

As can be seen from the FIGURE, the fluid channel 78 runs in a first part area 82 of the transmission housing 42, which is a stationary first component of the drive device 10 which is not rotatable about the axis of rotation 22. In a second part area 84 adjoining the first part area 82 in a direction of flow of the fluid through the fluid channel 78, the fluid channel 78 runs, as shown on the left-hand side of the FIGURE, in the drive shaft 66, which constitutes a second component of the drive device 10 rotatable about the axis of rotation 22 in relation to the first component.

The part areas 82, 84 are fluidly connected to one another via a rotating through-connection 85, so that fluid can flow across from the first part area 82 into the second part area 84.

A sleeve 88 is provided which is linked on one side fluidly with the second part area 84. This enables fluid to flow across from the second part area 84 into the hollow sleeve 88. On the other hand, the sleeve 88 is linked fluidly with a third part area 86 of the fluid channel 78 adjoining the second part area 84 in the flow direction of the fluid, so that fluid can flow across from the sleeve 88 into the third part area 86.

In the third part area 86, the fluid channel 78 runs, as shown on the right-hand side of the FIGURE, in the drive shaft 66. The fluid channel 78 runs in the right-hand drive shaft 66 in a first channel area 90 in the axial direction of the shaft. Second channel areas 92, which are linked fluidly with the first channel area 90 and which run at least essentially in a radial direction of the right-hand drive shaft 66, branch off from the first channel area 90.

It is thus possible for fluid to be conveyed by centrifugal force through the second channel areas 92 to the cooling and/or lubrication points 80b-d, 80f and 80g to lubricate and/or cool the sun wheels 30, 44, the planetary wheel elements 32, 46, respective teeth as well as the roller bearings 49 of the drive device 10. The flow of oil is indicated by directional arrows in the FIGURE. As these directional arrows show, other components of the drive device 10 can also be cooled and/or lubricated at other cooling and/or lubrication points 80e, 80i, 80j, 80k.

As can be seen from the directional arrow at the cooling and/or lubrication point 80a, the sleeve 88 has at least one through-opening, with the direction of the through-opening running at least essentially radially. Thus, it is possible for fluid from the fluid channel 78 to emerge from the sleeve 88 and, at the cooling and/or lubrication point 80a, to reach the balance studs 62 and possibly also proceed to reach the balance wheels 60 and/or the shaft wheels 64.

After fluid has emerged from the fluid channel 78, it is conveyed by centrifugal force as a result of the rotation especially of the drive shafts 66, the planetary gear 26, 28 and the differential gear 56, against wall surfaces of the drive device 10 and especially against the transmission housing 42, where the fluid cools down. Gravity in particular causes fluid to collect in a fluid reservoir 96 which is also referred to as oil sump. The fluid reservoir 96 is hereby formed at a lowest part of the drive device 10 or of the transmission housing 42 in the vertical direction.

Via an outlet channel 98, fluid collected in the fluid reservoir 96 can be transported away from the fluid reservoir 96 by a further pump device or by the pump device 76 and conveyed to the not shown heat exchanger. This closes the fluid circuit. Reference numeral 100 indicates a level of fluid in the fluid reservoir 96 of the drive device 10.

The first part area 82 and/or especially the outlet channel 98 can be used especially advantageously for cooling the transmission housing 42. Heat can be removed from the transmission housing 42 by fluid flowing through the outlet channel 98 in the fluid channel 78 and especially taken away from the installation area 70. This avoids build up of heat in the installation area 70.

Thus, a central cooling of all components of the transmission device 24 integrated into the rotor element 16 and thus of both the planetary gear 26 and also the differential gear 56 as well is a central lubrication of all rotating components of the transmission device is possible by the provision of the fluid supply device 74. In addition this cooling and/or lubrication can also be used to cool the electric machine 12.

As can be seen from the FIGURE, an air gap 102 is provided in the radial direction between the rotor element 16, especially the rotor carrier 20, and the transmission housing 42. The rotor element 16 rotating during the operation of the drive device 10 around the axis of rotation relative to the transmission housing 42 can thus be cooled by the fluid-cooled transmission housing 42 via the air gap 102.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A drive device for a motor vehicle, comprising:
   at least one electric machine having at least one rotor element which is configured to delimit an installation area in a radial direction;
   at least one transmission device disposed, at least partly, in the installation area and configured to be driven by the electric machine via the rotor element; and
   a fluid supply device having at least one fluid channel for supply of fluid to at least one member selected from the group consisting of a cooling point and a lubrication point of the drive device for cooling or lubricating the at least one member, said fluid channel having a first part area running in a stationary first component, and a second part area which adjoins the first part area in a flow direction of the fluid through the fluid channel and runs in a second component of the drive device, said second component being supported for rotation about an axis of rotation in relation to the first component,
   wherein the first component is a transmission housing of the transmission device and is disposed in the installation area and cooled by the fluid, and
   wherein the fluid-cooled transmission housing defines with the rotor element in the radial direction at least one elongated air gap, which extends uninterruptedly in an axial direction between a radially inner surface of the rotor element and a radially outer surface of the fluid-cooled transmission housing and via which the rotor element is cooled by the fluid-cooled transmission housing.

2. The drive device of claim 1, wherein the second component is a shaft rotatable about the axis of rotation.

3. The drive device of claim 2, wherein the fluid channel has a first channel area running in the shaft in the axial direction, and a second channel area adjoining the first channel area and running in the radial direction of the shaft.

4. The drive device of claim 3, wherein the second channel area opens out onto the at least one member.

5. The drive device of claim 3, wherein the at least one member is comprised of two members, one of the two members being assigned to one of the first and second channel areas and the other one of the two members being assigned to the other one of the first and second channel areas for supply of the fluid thereto, said first and second channel areas having flow cross-sections sized differently from one another.

6. The drive device of claim 1, further comprising at least one pump device for conveying fluid collected in a fluid reservoir out of the fluid reservoir.

7. The drive device of claim 1, further comprising a pump device for conveying the fluid, and configured for adjusting a pressure of the fluid.

8. The drive device of claim 1, wherein the fluid-cooled transmission housing is provided with at least one transmission wheel.

* * * * *